United States Patent Office 3,460,295
Patented Aug. 12, 1969

3,460,295
PROCESS FOR GRINDING GLASS WITH DIAMOND GRINDING SURFACE AND ALKALI METAL SOAP EMULSIFIABLE COMPOSITION
Ford C. Teeter, Palos Heights, Ill., assignor to Sinclair Research, Inc., New York, N.Y., a corporation of Delaware
No Drawing. Filed Mar. 21, 1966, Ser. No. 538,467
Int. Cl. B24b 1/00, 9/08
U.S. Cl. 51—283                      12 Claims

ABSTRACT OF THE DISCLOSURE

Glass is ground using a diamond grinding surface in the presence of a lubricant composed of an emulsifier dispersed in water. The emulsifiers of this invention are the alkali metal soaps of organic monocarboxylic acids of 12 to 30 carbon atoms. By employing these emulsifiers in the lubricant, good lubricant stability is realized during the grinding of glass along with increased diamond life. The lubricant employed in the process of this invention can also contain about 50 to 97 weight percent of a normally liquid hydrocarbon oil of lubricating viscosity.

---

This invention relates to emulsifiable compositions which can be dispersed in water as the continuous phase and used in the grinding of glass. More specifically, the invention concerns grinding glass with a diamond grinding surface and using the emulsifiable compositions as a lubricant in the grinding operation.

It is well known to grind glass by the use of iron runner plates and abrasives of sand and emery, together with water, followed by rouge polishing. The rough glass sheets are often passed under the grinding plates. Various grit sizes of sand followed by smaller sizes of emery are used to obtain the desired smoothness before polishing. This operation requires considerable handling and grinding time and is therefore costly. Recently, a new glass grinding process that utilizes industrial diamond grinding wheels has been developed, see for example, U.S. Patent No. 3,177,624 and U.S. Patent No. 3,177,628, herein incorporated by reference. These grinding wheels have sufficient rigidity to give the desired smoothness to the glass and enough resilience to minimize glass breakage. Moreover, the grinding wheels are designed so they can be used with current glass grinding equipment. In order to cool the grinding surfaces and to prevent excessive wear of the diamond wheel a coolant-lubricant is used in grinding operations.

Conventional lubricants used in the glass industry have suffered from many deficiencies. In some instances, because the amount of lubricant required is so great, its cost exceeds that of industrial diamonds used in the grinding operation. Present commercial lubricants also suffer from emulsion instability and may therefore be adversely affected when they come in contact with grinding debris, colloidal glass particles, and heat produced during grinding. Under such conditions, the emulsion may break and cause the oil to separate, thus increasing diamond wear or consumption. This necessitates frequent replacement of the lubricant thereby substantially increasing operating costs. Accordingly, there is a need for a new, improved and less costly lubricant composition for the diamond grinding of glass.

The present invention provides emulsifiable compositions which when dispersed in water as the continuous phase are especially useful as lubricants in the diamond grinding of glass. Advantageously, these lubricant compositions possess good stability in the presence of grinding debris, such as ground glass and can be effectively used with diamond grinding surfaces of various grit sizes. The lubricants have, however, shown emulsion instability in the presence of plaster of Paris and thus, their use in equipment having glass holders made of plaster of Paris is not recommended. Some grinding equipment employs vacuum holders and the compositions of this invention are especially suited for use in such machines.

It has been discovered that by using lubricant compositions of the present invention in the diamond grinding of glass, increased diamond life can be obtained with small, economical amounts of lubricant being consumed. The lubricant composition of the present invention is composed of anionic emulsifiers dispersed in water, the latter being the continuous phase. In a preferred feature the dispersed composition may also contain a lubricating oil. The presence or absence of the lubricating oil may depend upon the desired properties of the lubricant as will be discussed hereinafter.

The emulsifiers which are used in the compositions of the present invention are anionic, and can be used individually or as mixtures of emulsifiers to give a balanced, stable emulsified system. The emulsifiers are generally present in the emulsifiable composition in an amount of about 5–100% by weight. The emulsifiable composition, when dispersed in water as the continuous phase can be used as a lubricant in glass grinding operations. When the emulsifiable composition contains a lubricating oil it is usually present in an amount up to about 97 weight percent, and preferably is greater than about 50 weight percent. When forming the emulsion in water, ambient or slightly elevated temperatures may be used, e.g., the temperature is usually below about 110° F., and the mixture may be agitated to insure uniformity. The resulting soluble oil emulsion is regulated to give a stable, oil-in-water emulsion and the degree of stability may be dependent upon the particular use contemplated. The emulsifiable composition is often dispersed in water in a ratio of about 0.1 to 20 parts of emulsifiable composition for every 100 parts of water, preferably about 1–4 parts to every 100 parts of water. The presence of a lubricating oil in the composition can produce greater freedom in the glass grinding operations, thereby providing for greater flexibility.

The emulsifiers used in the glass grinding process of the present invention are alkali metal soaps of organic monocarboxylic acids. The monocarboxylic acids may contain from about 12 to 30 carbon atoms, may be saturated or unsaturated, aliphatic or aromatic, and may be substituted with non-deleterious substituents. Suitable acids include the fatty acids such as lauric, myristic, palmitic, stearic, behenic, cerotic; including the olefinically-unsaturated fatty or aliphatic acids such as oleic, linoleic, rosin acids and mixtures thereof. A preferred soap may be prepared from tall oil and an aqueous alkali such as NaOH, KOH, etc. Tall oil is essentially a mixture of rosin acids and one or more of an unsaturated fatty acid, e.g., oleic and linoleic acids. Tall oil may often comprise about 20 to 70% rosin acids and about 30 to 80% of a mixture of oleic and linoleic acids, usually containing a small amount of saturated fatty acids. The composition and properties of several commercially available tall oils are given in Table I. Mixtures of rosin and oleic acid may also be used. In such a case, the rosin acid may, for example, be present in amounts of about 3.5 to 40% and the oleic acid in amounts of from about 2.7 to 27% by weight of the emulsifiable composition.

TABLE I

| | Tall Oils | | | |
|---|---|---|---|---|
| | A | B | C | D |
| Typical Tests: | | | | |
| Specific Gravity at 25° C | .936 | .946 | .945 | 1.015 |
| Flash, ° F | 367 | 400 | 400 | |
| Fire, ° F | 428 | 435 | 437 | |
| Viscosity SUS at 100° F | 265 | | | |
| Viscosity SUS at 210° F | | 54 | 53 | |
| Rosin Acids, Percent | 25 | 29 | 29 | 58–62 |
| Fatty Acids, Percent | 73 | 69.5–68.8 | 68.8 | 34–40 |
| Unsaponifiable, Percent | 2 | 1.5–2.2 | 2.2 | 2–4 |
| Iodine Value | 150 | 155–165 | 157 | |
| Fatty Acid Composition, Percent: | | | | |
| Oleic | 51 | 51 | 52 | |
| Linoleic | 46 | 46 | 44 | |
| Saturated | 3 | 3 | 4 | |

The lubricating oils which can be employed in the composition of the present invention are normally liquid. Suitable oils include mineral oils such as neutral or other lubricating oil fractions, hydrogen-refined mineral oils, or synthetic oils such as polyesters, polymerized olefins and the like. The hydrocarbon oils are generally preferred. The lubricating oil component can be highly refined if desired such as white oil, or be highly refined by distillation, hydrogenation, solvent extraction or clay or chemical treatment. The viscosity of the oil component is quite variable and may for example, range from about 30 SUS at 100° F., to about 500 SUS at 210° F., the exact viscosity chosen depending upon the use contemplated. For the majority of applications, a mineral lubricating oil with a viscosity of about 60 to 400 SUS at 100° F., will be satisfactory. Examples of suitable lubricating oils are a refined naphthenic or coastal oil of 100 SUS at 100° F., and mineral seal oil which is a light distillate oil of 40–45% SUS at 100° F.

If desired, a coupling agent may be used in the lubricating composition of the present invention. Any suitable coupling agent may be used, such as aliphatic alcohols, including the mono- and di-hydroxy alcohols, particularly hydrocarbyl glycols and alkyl ether-alkanols, containing up to about 12 or even up to 30 carbon atoms, such as for example, the mono- and di-hydroxy alkyl ethers and glycols such as diethylene glycol, hexylene glycol, ethyl Cellosolve, butyl carbitol, butyl Cellosolve; and other polyether glycols with or without terminal ether groups. The coupling agents can be used either alone or in mixtures and in various amounts, for instance, from about 0.5 to 15% or more, preferably about 1 to 5% by weight of the emulsifiable oil.

The diamond grinding surface used in the process of the present invention comprises small particles of diamonds imbedded in a suitable matrix. The matrix is often termed "the bond." A metal matrix comprising for example, a mixture of copper, zinc, soldering agents, iron, manganese, etc., may be employed as a suitable bond for the small particles of industrial diamonds. A typical grinding surface used in glass grinding operations is a diamond grinding wheel and is generally made with metal bonds. One typical bond which has proved satisfactory includes approximately 60 percent copper, 24 percent zinc, 11 percent silver-copper-solder, with the silver making up two-thirds to three-fourths of the solder, about 2 percent of iron and 1 percent of manganese. Other bonds including copper and tin and various combinations of elements mentioned above, are also satisfactory. Steel bonded wheels may also be employed. In general, it is contemplated that a wide variety of bonds may be employed.

Various arrangements of grinding surfaces have been used.

Normally, successive grinding stations are provided for progressively grinding the glass with surfaces employing finer and finer diamonds. Frequently about 4 or more grinding stations may be employed. The overall diamond size used in glass grinding operations can vary from about 1 to 1000 microns. For example, the first stations may employ relatively coarse diamond grinding wheels containing diamond particles of about 250 to 350 microns, say about 275 microns (50–60 grit size) in diameter which can give a surface finish of about 150 microinches; intermediate stations may employ a diamond size of about 100 to 350 microns, say about 150 microns to give a surface finish of about 60 microinches and final stations may employ relatively fine diamond grinding wheels of about 5 to 15 microns, say about 10 microns to give a surface finish of about 7 microinches or less.

The diamond concentrations generally used in glass grinding operations can vary from about 0.05 to 20 carats/in.$^3$ of matrix with a concentration of about 0.1 to 9 carats/in.$^3$ frequently being used. Suitable diamond grinding wheels and their use in grinding glass are described in U.S. Patents Nos. 3,177,624 and 3,177,628.

The ease and efficiency of grinding is dependent upon many factors such as the concentration of diamonds in the wheel, the side of the diamonds, etc. However, regardless of these factors it has been found necessary under most conditions to use a fluid on the glass being ground which acts both as a coolant and lubricant. Grinding wheel life can be increased and power requirements decreased by using the proper lubricant. Grinding wheel life can be measured in cubic inches of glass removed per carat of diamond lost in the operation and for a given grit size a proper lubricant improves wheel life. Lubricants also tend to decrease grinding power requirements measured as spindle power.

TABLE II

| | Example | | | | | | |
|---|---|---|---|---|---|---|---|
| | 1 | 2 | 3 | 4 | 5 | 6 | 7 |
| Composition, Wt. percent: | | | | | | | |
| Tall Oil A | 10.0 | 10.0 | 10.0 | 34.0 | 56.0 | | |
| 100 SUS at 100° F. mineral oil | 82.75 | | | | | 10.0 | |
| 300 SUS at 100° F. mineral oil | | | 82.75 | 46.2 | | 80.62 | 80.9 |
| Mineral Seal Oil | | 82.75 | | | | | |
| Potassium Hydroxide | 1.75 | 1.75 | 1.75 | 5.75 | 9.5 | | |
| Water | 2.5 | 2.5 | 2.5 | 6.75 | 11.5 | 2.42 | 2.5 |
| Hexylene Glycol | 3.0 | 3.0 | 3.0 | 7.3 | 13.0 | | |
| Rosin M (Lump) | | | | | | 7.24 | |
| Oleic Acid | | | | | | 4.71 | |
| Tall Oil D | | | | | | | 12.5 |
| Butyl Cellosolve | | | | | | 2.92 | 3.0 |
| Sodium Hydroxide | | | | | | 1.04 | 1.1 |
| RD-124 Antifoam | | | | | | 1.05 | |
| Test Results: | | | | | | | |
| Gravity, ° API | 19.9 | 28.3 | 18.4 | 14.7 | 9.6 | 19.5 | 19.3 |
| Flash, ° F | 290 | 260 | 335 | 300 | 280 | 200 | 195 |
| Fire, ° F | 325 | 290 | 395 | 335 | 320 | 345 | 340 |
| Viscosity SUS at 100° F | 153.6 | 61.2 | 436 | 364 | 542 | 176.9 | 186.3 |
| Viscosity SUS at 210° F | 42.7 | 35.3 | 55.9 | 62.9 | 83.1 | | 43.1 |
| Pour, ° F | −25 | +25 | | 0 | +30 | −15 | −40 |
| Color, ASTM | | | | L2.0 | L2.5 | L3.0 | L1.5 |
| Water (by Fischer), percent | 2.29 | 3.11 | 2.98 | 8.08 | 11.4 | 2.77 | 2.6 |
| Sulfated Ash, percent | | | | 7.02 | 13.2 | 1.6 | 1.86 |
| Acid Number | 4.37 | 4.26 | 4.86 | 16.38 | 25.32 | 7.38 | |
| Saponification Number | 3.63 | 3.29 | 3.56 | 14.61 | 24.9 | | |

The anionic emulsifier-containing emulsion of this invention is most effective when the concentration of emulsifier is adjusted according to the size of diamond particles in the wheel. As the diamond size increases, the amount of emulsifier may also be increased. As an alternative to increasing the emulsifier content, the concentration of the dispersed phase in the water coolant can be increased, but increasing this concentration beyond a point, e.g., about 10%, is usually economically unattractive.

The examples in Table II illustrate seven typical lubricant compositions of the present invention and their use as a coolant-lubricant for grinding plate glass with diamond grinding wheels.

The compositions 1, 2, 3, 4 and 5 were evaluated in glass grinding operations as lubricants for diamond wheels of grit sizes varying from the relatively fine size of about 5 to 15 microns to the relatively coarse size of about 275 microns. Plate glass held in vacuum holders were ground by a succession of diamond wheels of decreasing grit size so that as the glass became smoother a finer grit size was used. A coarse grit size wheel of about 275 microns was used until an average surface finish of about 150 microinches was obtained; an intermediate grit size of about 150 microns was used until an average surface finish of about 60 microinches was obtained; and a fine grit size of about 10 microns was used until an average surface finish of about 7 microinches obtained. The glass work surface was cooled and lubricated with an emulsion at a concentration of about 1 part of the soluble oil to 100 parts of water. Diamond life was evaluated in terms of cubic inches of glass removed per carat of diamond lost. The net spindle power and average surface finish were also evaluated. The results are given in Table III.

tive. For intermediate size grinding surfaces, say about 100 to 350 microns an emulsifier content similar to that used for the coarse grinding surface has been useful. For relatively fine grinding surfaces of about 5 to 15 microns an emulsifier content of 5 to 20% of the emulsifiable composition has been advantageous.

Thus, it is advantageous to have the proper emulsifier content for each particular grit size diamond wheel. This is especially true for the fine grit size and coarse grit size. With the intermediate grit size diamond wheels the effect of emulsifier content was less significant.

The lubricant of Example 6 was also evaluated. In a test using the relatively fine grit size diamond wheel, a quantity of glass was removed per carat of diamond consumed that was comparable to the amount removed when using the lubricant of Example 1. The oil of Example 6 is compounded from the sodium soaps of rosin and oleic acid. By using two separate emulsifiers, even greater latitude is afforded in selecting the most suitable proportions for specific applications.

It is claimed:

1. A process for grinding glass with a diamond grinding surface which consists essentially of grinding glass by contacting it with a diamond grinding surface in the presence of a lubricant in which water is the continuous phase and an emulsifiable composition is the dispersed phase, said emulsifiable composition consisting essentially of alkali metal soaps of organic monocarboxylic acids of 12 to 30 carbon atoms and a normally liquid lubricating oil in amount up to about 97 weight percent.

2. The process of claim 1 wherein the concentration of the emulsifiable composition in water is about 1 to 4 weight percent.

TABLE III

| Lubricating Composition of example | Diamond Life, Cubic Inches of Glass Removed per Carat | Net Spindle Power (Watts) | Average Surface Finish (Microinch) | Comments |
|---|---|---|---|---|
| Relatively Coarse Grit Size Diamond Wheel | | | | |
| 1 | 6,569 | 903 | 146 | |
| 2 | 7,338 | 812 | 154 | |
| 3 | 6,919 | 898 | 148 | |
| 4 | 10,736 | 860 | 149 | |
| 5 | 10,362 | 708 | 150 | Heavy Foaming. |
| Relatively Fine Grit Size Diamond Wheel | | | | |
| 1 | 1,000 | 760 | 5.8 | |
| 2 | 1,042 | 720 | 7.0 | |
| 3 | 1,229 | 720 | 6.5 | |
| 4 | 837 | 560 | 7.0 | |
| 5 | 825 | 520 | 7.3 | Foaming. |
| Intermediate Grit Size Diamond Wheel | | | | |
| 1 | 3,897 | 1,869 | 66 | |
| 4 | 4,933 | 1,882 | 55 | |

From the data in Table III it can be concluded that the effect of the viscosity of lubricating oil does not appear to be significant as shown by the results of Examples 1, 2 and 3. The effect of increasing the emulsifier content appears to be quite significant as shown by comparing the results of Example 1 with Example 4 containing about 3½ times the emulsifier content of Example 1 and with Example 5 containing about 5½ times the emulsifier content of Example 1. In the case of the relatively coarse grit size diamond wheel, the increased emulsifier content significantly improved the diamond life of the grinding wheels. Of the two soluble lubricating oils of Examples 4 and 5, the composition of Example 4 is preferred since it gave diamond life equivalent to Example 5, without the objectionable foaming. In the case of the relatively fine grit size diamond wheel, the increased emulsifier content gave reduced diamond life. With intermediate grit sized diamond wheels, the effect of emulsifier content is less significant. Thus, for relatively coarse diamond grinding surfaces containing particles of about 250 to 350 microns, an emulsifier content of about 25 to 75% of the emulsifiable composition has been effec- 3. The process of claim 1 wherein the normally liquid lubricating oil is a hydrocarbon oil and is greater than about 50 weight percent.

4. The process of claim 3 wherein the lubricant is recycled across the grinding surface.

5. The process of claim 1 wherein the diamond grinding surface consists essentially of a series of grinding stations employing relatively coarse diamond grinding surfaces containing diamond particles of about 250 to 350 microns, intermediate size grinding surfaces containing diamond particles of about 100 to 350 microns, and fine grinding surfaces containing diamond particles of about 5 to 15 microns.

6. The process of claim 5 wherein the emulsifiable composition used for the relatively coarse and intermediate size diamond grinding surfaces has an emulsifier content of about 25 to 75% by weight, and the emulsifiable composition used for the fine grinding surface has an emulsifier content of about 5 to 20% by weight.

7. A process for grinding glass with a diamond grinding surface which consists essentially of grinding glass by contacting it with a diamond grinding surface in the presence of a lubricant in which water is the continuous phase and an emulsifiable composition is the dispersed phase, said emulsifiable composition consisting essentially of alkali metal soaps of organic monocarboxylic acids of 12 to 30 carbon atoms, from about 0.5 to 15% by weight of a coupling agent selected from the group consisting of aliphatic mono- and di-hydroxy alcohols and mono- and di-hydroxy alkyl ethers of up to about 30 carbon atoms, and about 50 to 97 weight percent of a normally liquid oil of lubricating viscosity, which emulsifiable composition is dispersed in water in a concentration of about 1 to 4 weight percent.

8. The process of claim 7 wherein the oil of lubricating viscosity is a hydrocarbon oil having a viscosity in the range of about 30 SUS at 100° F. to about 500 SUS at 210° F.

9. The process of claim 8 wherein the hydrocarbon oil has a viscosity in the range of about 60 to 400 SUS at 100° F.

10. The process of claim 7 wherein the diamond grinding surface consists essentially of a series of grinding stations employing relatively coarse diamond grinding surfaces containing diamond particles of about 250 to 350 microns, intermediate size grinding surfaces containing diamond particles of about 100 to 350 microns, and fine grinding surfaces containing diamond particles of about 5 to 15 microns.

11. The process of claim 10 wherein the emulsifiable composition used for the relatively coarse and intermediate size diamond grinding surfaces has an emulsifier content of about 25 to 75% by weight, and the emulsifiable composition used for the fine grinding surface has an emulsifier content of about 5 to 20% by weight.

12. The process of claim 7 wherein the alkali metal soaps of the organic monocarboxylic acids are prepared from tall oil.

References Cited

UNITED STATES PATENTS 3,177,624 4/1965 Highberg _____ 51—283 X
3,177,628 4/1965 Highberg _____ 51—283

LESTER M. SWINGLE, Primary Examiner